J. CARPENTER.
Wagon-Brake.

No. 227,215. Patented May 4, 1880.

Witnesses
C. Bendixen
Wm. C. Raymond

Inventor
James Carpenter
per Duell, Laass & Hey
attorneys

UNITED STATES PATENT OFFICE.

JAMES CARPENTER, OF NEW HOPE, NEW YORK.

WAGON-BRAKE.

SPECIFICATION forming part of Letters Patent No. 227,215, dated May 4, 1880.

Application filed February 21, 1880.

*To all whom it may concern:*

Be it known that I, JAMES CARPENTER, of New Hope, in the county of Cayuga, in the State of New York, have invented new and useful Improvements in Wagon-Brakes (not patented to me nor, with my knowledge or consent, in any foreign country,) and of which the following, taken in connection with the accompanying drawings, is a full, clear, and exact description.

Figure 1:
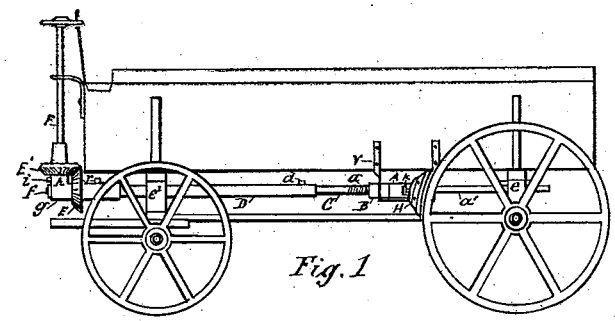
Figure 2:
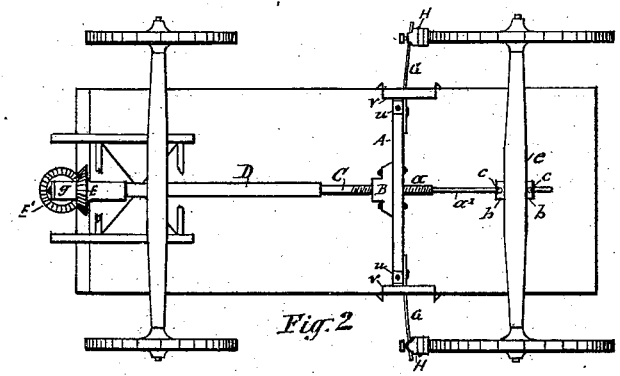
Figures 3, 4, 5:
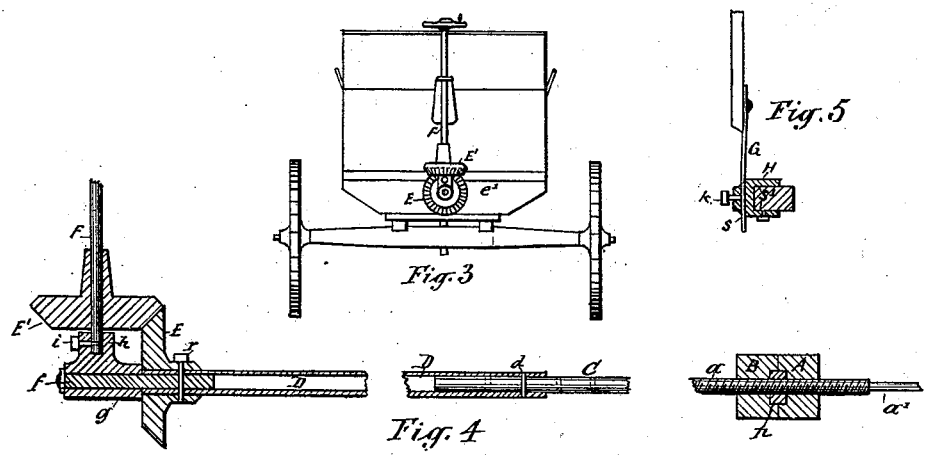

In the accompanying drawings, Figure 1 is a side view of a vehicle provided with my improved brake; Fig. 2, an inverted plan view of same; Fig. 3, a front-end view; Fig. 4, an enlarged detail view of the devices by which power is transmitted to the brake-bar, and Fig. 5 an enlarged detail view of the brake-shoe and its connection with the brake-bar.

Similar letters of reference indicate corresponding parts.

A represents the brake-bar, arranged transversely underneath the body of the vehicle. To the front side of the brake-bar is bolted a block, B, and between the adjacent faces of the brake-bar and the block B is countersunk a nut, $n$, fitted into its seat, so as to prevent its turning and be completely inclosed therein, and thus be protected from dust and dirt.

C is a rod passing transversely through the brake-bar A and block B, and having a screw-threaded part, $a$, working in the nut $n$. From the threaded part $a$ to the rear extremity, as shown at $a'$, the rod is circumferentially diminished to allow it to freely pass through the nut and save the expense of cutting the threads the entire length of the rods. The rear end of the said rod passes through the hind bolster, $e$, of the vehicle, and is provided at opposite sides of said bolster with a nut, $b$, whereby it is adjustably restrained from longitudinal movement. By means of a set-screw, $c$, inserted through the side of the nut $b$ and bearing on the rod C, the said nut is prevented from working loose. The opposite end of the rod C is inserted into the rear end of a tubular bar, D, and confined therein by a set-screw or pin, $d$, passing diametrically through both bars. The bar or rod C is provided with a series of holes for the passage of said fastening-key, so as to admit of extending or contracting the length of the combined bars and adjust the same according to the extension or contraction of the reach. The tubular bar D is extended through the forward bolster, $e'$, and to the forward extremity is attached a beveled gear, E, through the hub of which is inserted a key or set-screw, $r$, which passes through the tubular bar D and into a bolt, $f$, which is inserted into the interior of the front end of the tube and carries in front of the gear E a loose sleeve, $g$, which is provided on top with a socket, $h$, in which is stepped a vertical rod, F. The rod F is provided with a bevel-gear, E', which meshes into the gear E, and to the upper end of said rod is attached a hand-wheel or crank for turning it. A set-screw, $i$, inserted through the side of the socket and entering a circumferential groove in the exterior of the stepped end of the rod F, prevents said rod from lifting out of the socket and maintains the two gears in connection with each other.

By the employment of the tubular section D, and its peculiar connection with the screw-rod C and with the sleeve $g$, I obtain a light yet rigid means of transmitting power to the brake-bar, and adapt and greatly facilitate the attachment of the device to almost any vehicle.

The brake-bar A is terminated some distance inside of the wheels, and to its extremity is attached a spring-leaf or spring-bar, G, which projects over the periphery of the wheel.

H is a metallic brake-shoe provided with a socket or slot, $s$, by which it slides on the free end of the spring G. A set-screw, $k$, inserted through the back of the brake-shoe and engaging the spring, serves to hold the brake-shoe in its desired position.

That side of the brake-shoe which faces the wheel is provided with a recess or socket, $s'$, in which is inserted a wooden friction-block, secured therein by set-screws passing through the sides of the metallic shoe.

The object of employing the spring G in connection with the brake-bar and brake-shoe in the manner described is to allow the shoe to yield to any variations which may exist in the bearings of the periphery of the wheel, and to allow the shoe to be set in or out, so as to bring against the wheel different wearing-surfaces of the wooden friction-block, which may be of any desired width.

The ends of the brake-bar slide and are supported on a bracket, v, on the side of the vehicle-body. Plates u u, attached to the under side of the brake-bar and abutting against the inner edge of the respective brackets v v, prevent lateral motion of the brake-bar and serve to maintain the brake-shoes in range with the wheels.

Having thus described my invention, what I claim as new, and desire to secure by Letters Patent, is—

1. In combination with the bolsters e e' and the brake-bar A, provided with the nut n, the screw-rod C, having the circumferentially-reduced rear end, a', provided with nuts b b at opposite sides of the hind bolster, and the tubular bar D, adjustably connected to the forward end of the rod C by telescopic joint and by a pin or set-screw, d, and provided at its forward end with the gear E, substantially as described and shown.

2. The combination of the tubular bar D, the gear E, applied to the end thereof, the bolt f, sleeve g, provided with socket h, and the set-screw r, passing through the hub of the gear and through the bar D into the bolt f, substantially in the manner specified and shown.

3. In combination with the tubular bar D, provided with the gear E, the bolt f, sleeve g, provided with the socket h and set-screw i, and the rod F, provided with gear E' and stepped in the socket h, and having on its stepped end a circumferential groove for the bearing of the set-screw, substantially as and for the purpose set forth.

4. In combination with the screw-rod C, the brake-bar A, provided with the block B, and the nut n, confined and inclosed between said brake-bar and its block B, substantially as and for the purpose specified.

5. In combination with the brake-bar A, provided at its ends with the spring-plate G, the shoe H, adapted to slide longitudinally on said plate and provided with the set-screw K, substantially as described and shown, for the purpose set forth.

In testimony whereof I have hereunto signed my name and affixed my seal, in the presence of two attesting witnesses, at Syracuse, in the county of Onondaga and State of New York, this 6th day of February, 1880.

JAMES CARPENTER. [L. S.]

Witnesses:
  E. LAASS,
  WM. C. RAYMOND.